United States Patent
Chang

(10) Patent No.: US 8,568,013 B2
(45) Date of Patent: Oct. 29, 2013

(54) BACKLIGHT MODULE

(75) Inventor: Liang-Kang Chang, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 309 days.

(21) Appl. No.: 13/008,022

(22) Filed: Jan. 18, 2011

(65) Prior Publication Data

US 2011/0228560 A1    Sep. 22, 2011

(30) Foreign Application Priority Data

Mar. 19, 2010   (CN) .......................... 2010 1 0143036

(51) Int. Cl.
*F21V 7/04* (2006.01)

(52) U.S. Cl.
USPC ........... 362/617; 362/606; 362/608; 362/610; 362/612; 362/615

(58) Field of Classification Search
USPC ........... 36/617, 606, 608, 610, 615, 612, 628, 36/511, 23.09; 349/64; 385/146, 901
See application file for complete search history.

(56) References Cited

U.S. PATENT DOCUMENTS

| | | | |
|---|---|---|---|
| 7,088,333 B1 | 8/2006 | Manabe et al. | |
| 7,380,969 B2 * | 6/2008 | Yamashita et al. | ............ 362/612 |
| 7,492,346 B2 | 2/2009 | Manabe et al. | |
| 2004/0183774 A1 | 9/2004 | Manabe et al. | |
| 2009/0160758 A1 | 6/2009 | Manabe et al. | |

FOREIGN PATENT DOCUMENTS

| | | |
|---|---|---|
| CN | 1862335 | 11/2006 |
| TW | I224182 | 11/2004 |
| TW | I249053 | 2/2006 |

* cited by examiner

*Primary Examiner* — Jong-Suk (James) Lee
*Assistant Examiner* — Mark Tsidulko
(74) *Attorney, Agent, or Firm* — Jianq Chyun IP Office

(57) ABSTRACT

A backlight module includes a light guide plate (LGP) and a light emitting unit. The LGP has a first surface, a second surface, a light incident surface, a first curved convex surface, a first plane, a second curved convex surface and a second plane. The first surface has a visual area. The second surface is opposite to the first surface. The light incident surface, the first curved convex surface, the first plane, the second curved convex surface, and the second plane connects the first surface and the second surface. The light incident surface connects the first plane and the second plane. The light emitting unit is disposed beside the light incident surface for emitting a light beam, wherein the light beam is capable of entering the LGP through the light incident surface, and being transmitted out of the LGP through the visual area of the first surface.

20 Claims, 10 Drawing Sheets

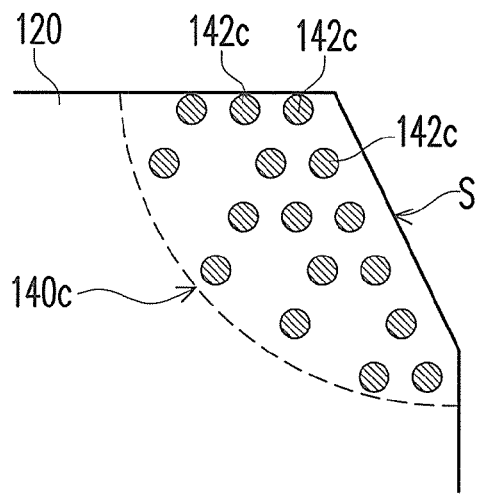
FIG. 7
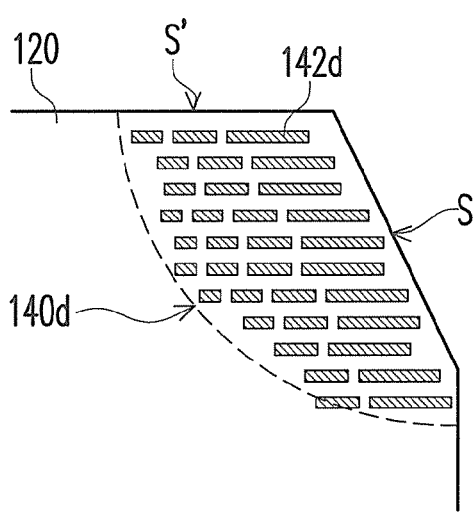 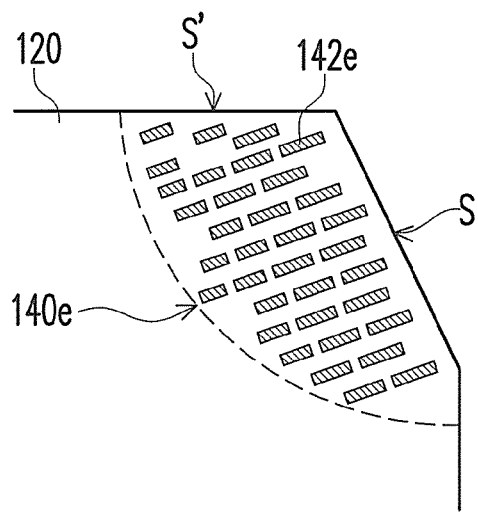
FIG. 8A    FIG. 8B

BACKLIGHT MODULE

CROSS-REFERENCE TO RELATED APPLICATION

This application claims the priority benefit of China application serial no. 201010143036.7, filed on Mar. 19, 2010. The entirety of the above-mentioned patent application is hereby incorporated by reference herein and made a part of this specification.

BACKGROUND

1. Field of the Invention

The invention relates to a light source module. More particularly, the invention relates to a backlight module 2. Description of Related Art With a quick development of flat panel display technology, liquid crystal displays (LCDs) are widely used in daily life. The LCD has advantages of light weight, small size, low power consumption, thin thickness, etc., so the LCD has gradually replaced a conventional cathode ray tube (CRT).

The LCD includes a liquid crystal panel and a backlight module, wherein the backlight module is disposed at the back of the liquid crystal panel for providing a surface light source required by the liquid crystal panel. The backlight modules may be grouped into direct type backlight modules and side type backlight modules according to positions of light emitting devices thereof. In the side type backlight module, a light guide plate (LGP) is used to guide light emitted from the light emitting device disposed at a side of the LGP to provide the surface light source required by the liquid crystal panel. Moreover, the backlight modules may be further grouped into light emitting diode (LED) backlight modules and cold cathode fluorescent tube backlight modules according to a type of the light emitting device.

In the side type backlight module using the LEDs as the light emitting devices, a plurality of LEDs arranged in a line and spaced from each other are configured beside a light incident surface of the LGP. The LEDs respectively emit a plurality of light beams, and the light beams enter the LGP from the light incident surface. Since the LED has a relatively high directivity, a light emerging angle thereof is limited, so that the LGP may form a bright area at a region near the LED and falling within a range of the light emerging angle, and form a dark area at a region outside of the range of the light emerging angle. The bright area and the dark area may result in uneven surface light source provided by the LGP, and the phenomenon of the uneven surface light source is a so-called hot spot phenomenon. As a power of the LED is continually increased in recent years, a number of the LEDs configured at a side of the light incident surface of the LGP may be relatively less. However, when the number of the LEDs is decreased, the space between two neighbouring LEDs is increased, as a result, the dark area is increased, i.e. the hot spot phenomenon is aggravated, and accordingly the surface light source may be more uneven.

U.S. Pat. No. 7,492,346 and U.S. Pat. No. 7,088,333, U.S. Patent Publication No. 20040183774, and U.S. Patent Publication No. 20090160758 of its patent family disclose a LGP having a light incident portion, a light guiding portion, and a light emerging portion. The light incident portion is located at a corner of the LGP, and the light guiding portion has two bending edges. Taiwan Patent No. I224182 discloses a LGP having a thick side edge. A concave surface of the LGP is a combination of a slope and a curved surface, and the concave surface may guide light emitted by a light emitting device into the LGP. Taiwan Patent No. I249053 discloses a LGP having a light mixing structure and a light emerging portion, wherein the light mixing structure includes a light divergent part and a light convergent part, and an edge of the light divergent part is a straight side. China Patent Publication No. 200510034654 discloses a backlight module including a LGP, a light source, and a reflection mask. The light source is disposed at a corner of the LGP, and the reflection mask is used for guiding the light emitted from the light source into a light incident surface of the LGP.

SUMMARY

The invention is directed to a backlight module, capable of providing uniform surface light source.

Additional aspects and advantages of the invention may be set forth in the description of the techniques disclosed in the invention.

To achieve at least one of aforementioned objectives or other objectives, an embodiment of the invention provides a backlight module including a light guide plate (LGP) and a light emitting unit. The LGP has a first surface, a second surface, a light incident surface, a first curved convex surface, a first plane, a second curved convex surface, and a second plane. The first surface has a visual area. The second surface is opposite to the first surface. The light incident surface connects the first surface and the second surface. The first curved convex surface connects the first surface and the second surface. The first plane connects the first surface and the second surface, and connects the first curved convex surface and the light incident surface. The second curved convex surface connects the first surface and the second surface. The second plane connects the first surface and the second surface, and connects the second curved convex surface and the light incident surface. The light incident surface connects the first plane and the second plane. A distance between the visual area and a first end of the first curved convex surface connected to the first plane is greater than a distance between the visual area and a second end of the first curved convex surface apart from the first plane. A distance between the visual area and a third end of the second curved convex surface connected to the second plane is greater than a distance between the visual area and a fourth end of the second curved convex surface apart from the second plane. The light emitting unit is disposed beside the light incident surface, and is used for emitting a light beam, wherein the light beam enters the LGP through the light incident surface, and is transmitted out of the LGP through the visual area of the first surface.

According to the above descriptions, the backlight module according to the embodiment of the invention may have at least one of the following advantages or effects. In the backlight module according to the embodiment of the invention, since the LGP has the first plane, the first curved convex surface, the second plane, and the second curved convex surface at two sides of the light incident surface, the light beam from the light incident surface may be evenly transmitted to a portion of the LGP located apart from the light incident surface, so that the backlight module according to the embodiment of the invention may provide a surface light source with better uniformity.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7 is a diagram illustrating a corner of a reflection unit of a backlight module and a light absorbing unit thereon according to yet another embodiment of the invention.

FIG. 8A is a diagram illustrating a corner of a reflection unit of a backlight module and a light absorbing unit thereon according to still another embodiment of the invention.

FIG. 8B is a diagram illustrating a corner of a reflection unit of a backlight module and a light absorbing unit thereon according to still another embodiment of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional tell sinology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
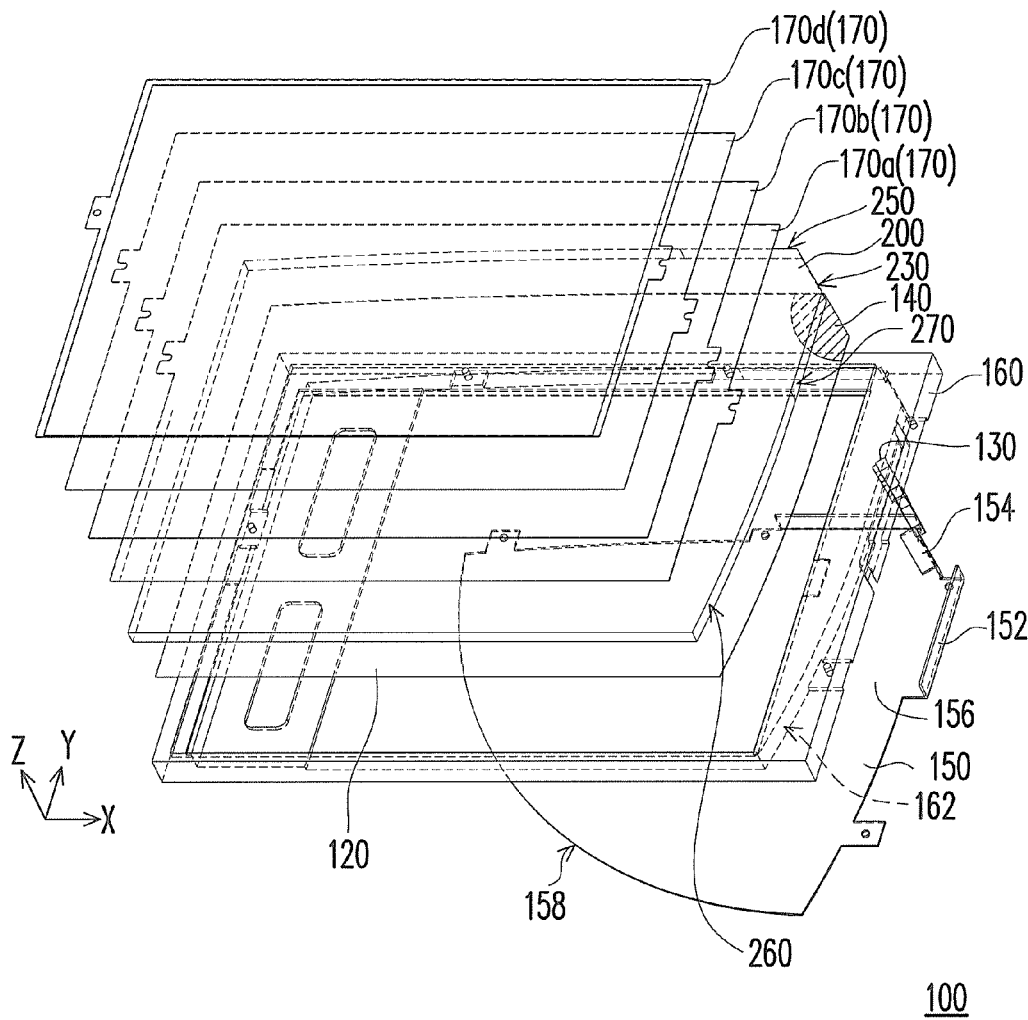
FIG. 1A is an exploded view of a backlight module according to an embodiment of the invention.
Figure 1B:
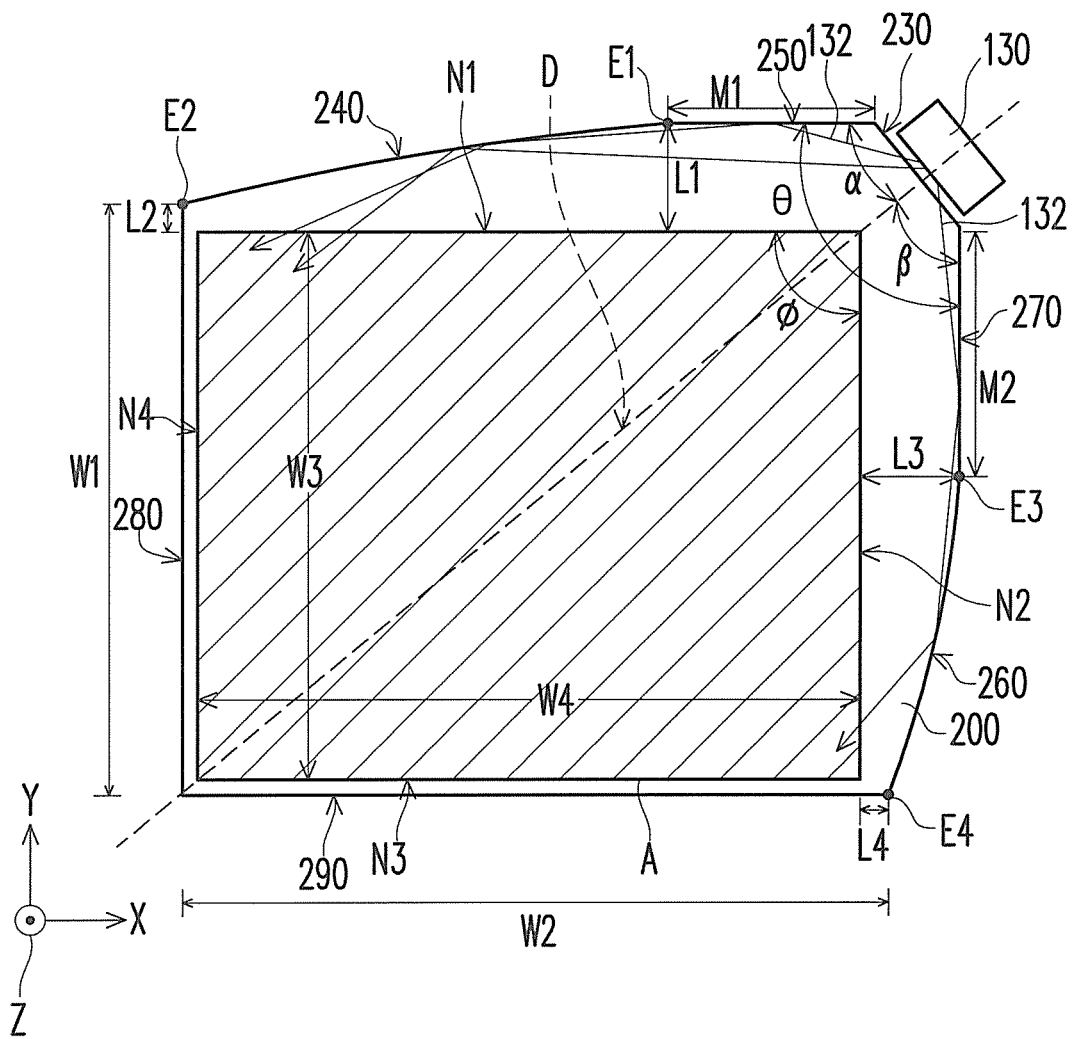
FIG. 1B is a top view of a light emitting unit and a light guide plate (LGP) of FIG. 1A.
Figure 1C:
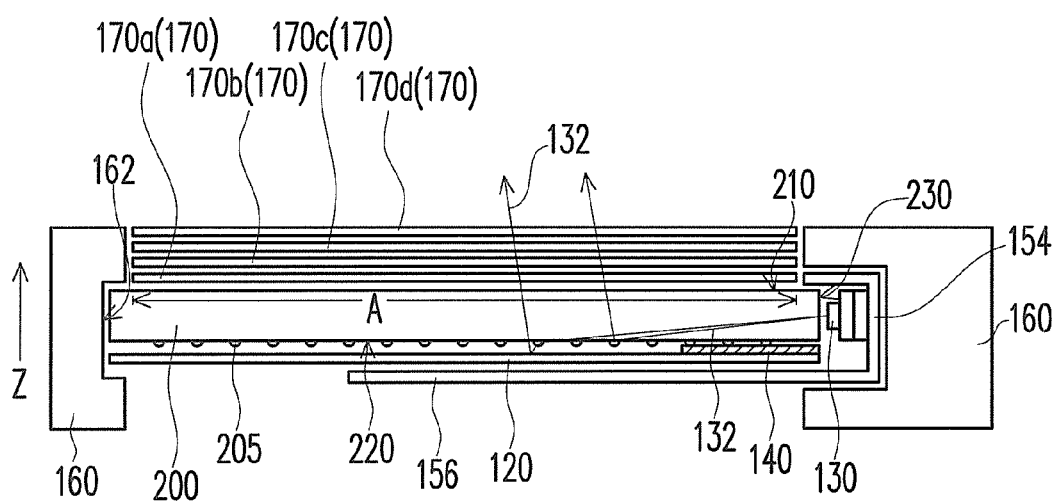
FIG. 1C is a cross-sectional view of FIG. 1A along a diagonal D and its extending line of a visual area of FIG. 1B.

Referring to FIGS. 1A-1C, X, Y, Z Cartesian coordinates may be referred for directions, and the backlight module 100 of the embodiment includes a LGP 200 and a light emitting unit 130. The LGP 200 has a first surface 210, a second surface 220, a light incident surface 230, a first curved convex surface 240, a first plane 250, a second curved convex surface 260, and a second plane 270. The first surface 210 has a visual area A. The second surface 220 is opposite to the first surface 210. The light incident surface 230 connects the first surface 210 and the second surface 220. The first curved convex surface 240 connects the first surface 210 and the second surface 220. The first plane 250 connects the first surface 210 and the second surface 220, and connects the first curved convex surface 240 and the light incident surface 230. The second curved convex surface 260 connects the first surface 210 and the second surface 220. The second plane 270 connects the first surface 210 and the second surface 220, and connects the second curved convex surface 260 and the light incident surface 230. The light incident surface 230 connects the first plane 250 and the second plane 270. A distance L1 between the visual area A and a first end E1 of the first curved convex surface 240 connected to the first plane 250 is greater than a distance L2 between the visual area A and a second end E2 of the first curved convex surface 240 apart from the first plane 250. A distance L3 between the visual area A and a third end E3 of the second curved convex surface 260 connected to the second plane 270 is greater than a distance L4 between the visual area A and a fourth end E4 of the second curved convex surface 260 apart from the second plane 270.

The light emitting unit 130 is disposed beside the light incident surface 230, and is used for emitting a light beam 132. In the embodiment, the light emitting unit 130 includes at least one light-emitting diode (LED). The light beam 132 enters the LGP 200 through the light incident surface 230, and is transmitted out of the LGP 200 through the visual area A of the first surface 210. In detail, the light beam 132 entering the LGP 200 through the light incident surface 230 may be continually and totally reflected by the first surface 210 and the second surface 220. However, a plurality of light-scattering microstructures 205 is disposed on at least one of the first surface 210 and the second surface 220 (in FIG. 1C, the second surface 220 is taken as an example) of the LGP 200 to spoil the total reflection. In this way, a part of the light beam 132 is scattered to the first surface 210 by the light-scattering microstructures 205, and is transmitted out of the LGP 200 by penetrating through the visual area A of the first surface 210.

Moreover, another part of the light beam 132 is scattered to a reflection unit 120 located at a side of the second surface 220 by the light-scattering microstructures 205, and the reflection unit 120 reflects the light beam 132, so that the light beam 132 sequentially penetrates through the second surface 220 and the visual area A of the first surface 210, wherein the reflection unit 120 is, for example, a reflection sheet. Moreover, the visual area A is defined as a light emerging area on the first surface 210 of the LGP 200, and the light beam 132 emitted out from such area may be transmitted out of the backlight module 100 for being observed by an observer.

In the embodiment, the light incident surface 230 is located at a corner of the LGP 200. Moreover, in the embodiment, the visual area A has a first side N1 and a second side N2 connected to the first side N1, an angle Φ unequal to 180 degrees is formed between the first side N1 and the second side N2, and in FIG. 1B, a situation that the first side N1 is perpendicular to the second side N2 is taken as an example, i.e. the angle Φ is equal to 90 degrees. Moreover, in the embodiment, the light incident surface 230 is located between the light emitting unit 130 and the angle Φ, the first plane 250 and the first curved convex surface 240 are located at a side of the first side N1, and the second plane 270 and the second curved convex surface 260 are located at a side of the second side N2.

In the embodiment, an absolute value of a slope of the first curved convex surface 240 relative to the first side N1 is progressively decreased from the second end E2 to the first end E1, and an absolute value of a slope of the second curved convex surface 260 relative to the second side N2 is progressively decreased from the fourth end E4 to the third end E3. Moreover, in the embodiment, the slope of the first curved convex surface 240 at the first end E1 is closed to or equal to a slope of the first plane 250 relative to the first side N1, and the slope of the second curved convex surface 260 at the third end E3 is closed to or equal to a slope of the second plane 270 relative to the second side N2. For example, in the embodiment, the first plane 250 is substantially parallel to the first side N1, so the slope of the first plane 250 relative to the first side N1 is 0, and therefore the slope of the first curved convex surface 240 relative to the first side N1 at the first end E1 is approximate to or equal to 0. Similarly, in the embodiment, the second plane 270 is substantially parallel to the second side N2, so the slope of the second plane 270 relative to the second side N2 is 0, and therefore the slope of the second curved convex surface 260 relative to the second side N2 at the third end E3 is approximate to or equal to 0. In the embodiment, the first curved convex surface 240 on an X-Y plane of FIG. 1B may be described by a following mathematic equation:

$$X=C_1(Y+K_1)^{Q_1}+K_2$$

Figure 2:
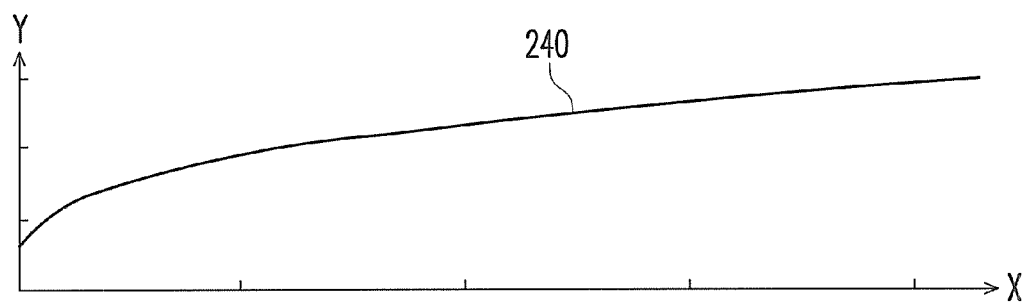
FIG. 2 is a curve diagram of a first curved convex surface 240 of FIG. 1B.

Wherein, X and Y are respectively an X coordinate value and a Y coordinate value, and $C_1$, $K_1$, $Q_1$ and $K_2$ are all constants, and values of $C_1$, $K_1$, $Q_1$ and $K_2$ are determined according to an actual utilization requirement. After a length W1 of a side 280 of the LGP 200, the distances L1 and L2, and a length M1 of the first plane 250 on the X-Y plane are determined, positions of the first end E1 and the second end E2 are determined, and in case that the slope of the second end E2 is required to be closed to or equal to the slope of the first plane 250, the mathematic equation and a curve (shown in FIG. 2) suitable for representing the first curved convex surface 240 may be obtained. The situation that the slope of the second end E2 is equal to the slope of the first plane 250 may be naturally formed during injection molding of the LGP 200 due to that the second end E2 is liable to present a smooth state, or the second end E2 that is originally not smooth may be grinded to have the smooth state.

Similarly, the second curved convex surface 260 on an X-Y plane of FIG. 1B may be described by a following mathematic equation:

$$Y=C_2(X+K_3)^{Q_2}+K_4$$

Wherein, X and Y are respectively an X coordinate value and a Y coordinate value, and $C_2$, $K_3$, $Q_2$ and $K_4$ are all constants, and values of $C_2$, $K_3$, $Q_2$ and $K_4$ are determined according to an actual utilization requirement.

In the embodiment, the first plane 250 is substantially perpendicular to the second plane 270, i.e. an angle θ between the first plane 250 and the second plane 270 is substantially 90 degrees. Moreover, in the embodiment, a length of the first side N1 is greater than the length of the second side N2. In other words, in the embodiment, the visual area A is a rectangular region, and the visual area A is encircled by the first side N1, the second side N2, a third side N3, and a fourth side N4. The light incident surface 230 and the light emitting unit 130 are located on an extending line of a diagonal D of the visual area A. Moreover, in the embodiment, the extending line of the diagonal D of the visual areas A is substantially perpendicular to the light incident surface 230.

In the embodiment, an angle α formed between the first plane 250 and the extending line of the diagonal D is $\tan^{-1}$(W1/W2), wherein W2 is a length of a side 290 of the LGP 200. In the embodiment, the side 290 is substantially perpendicular to the side 280, and the angle α is between 30 degrees and 60 degrees. Moreover, since θ=90 degrees, an angle β formed between the second plane 270 and the extending line of the diagonal D is also between 30 degrees and 60 degrees.

In the embodiment, the length M1 is not equal to the length M2, and the length M1 and the length W2 satisfy a following equation:

$$M1=K_5*W2, \text{wherein } K_5 \text{ is a constant.}$$

The length M2 and the length W1 satisfy a following equation:

$$M2=K_6*W1, \text{wherein } K_6 \text{ is a constant.}$$

The length W3 and the length W1 satisfy a following equation:

$$W3=K_7*W1, \text{wherein } K_7 \text{ is a constant.}$$

The length W4 and the length W2 satisfy a following equation:

$$W4=K_8*W2, \text{wherein } K_8 \text{ is a constant.}$$

The above constants $K_5$, $K_6$, $K_7$ and $K_8$ are all less than 1, and may be determined according to an actual utilization requirement.

Figure 3:
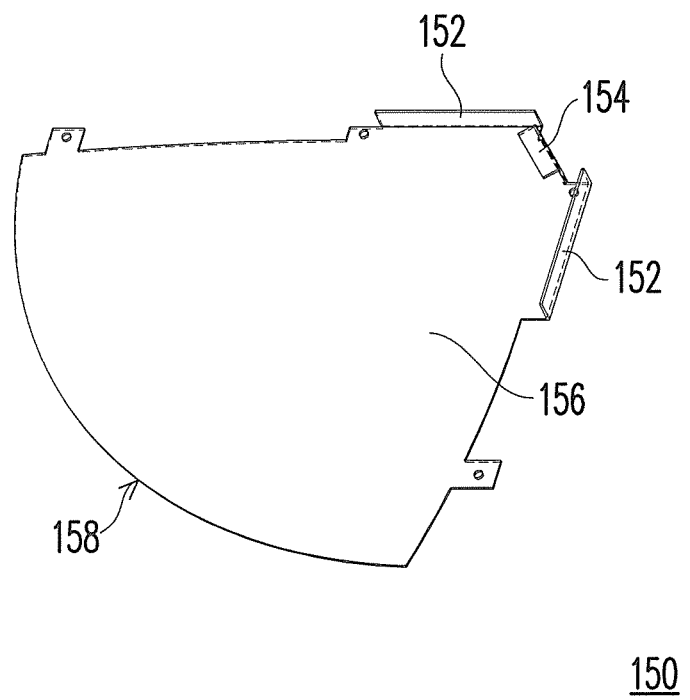
FIG. 3 is a three-dimensional view of a heat sink of FIG. 1A and FIG. 1C.

In the embodiment, the backlight module 100 further includes a heat sink 150. The heat sink 150 includes a flat panel portion 156, a lampshade portion 154, and at least one bending portion 152 (two bending portions 152 are illustrated in FIG. 1A and FIG. 3). The reflection unit 120 is disposed between the second surface 220 and the flat panel portion 156, the light emitting unit 130 is disposed in the lampshade portion 154, and the bending portions 152 are respectively bended to beside the first plane 250 and the second plane 270 of the LGP 200 to increase a heat dissipation area of the heat sink 150. By using the heat sink 150, heat energy generated by the light emitting unit 130 may be effectively dissipated to the outside of the backlight module 100, so as to increase a brightness and a service life of the light emitting unit 130. In the embodiment, a side 158 of the heat sink 150 opposite to the lampshade portion 154 has an arc shape, so as to increase a heat dissipation efficiency of the heat sink 150.

In the embodiment, the backlight module 100 further includes an outer frame 160 wrapping an edge of the LGP 200 and covering an area of the first surface 210 other than the visual area A. The outer frame 160 is, for example, a resin frame. In the embodiment, an inner surface 162 of the outer frame 160 encircles the first plane 250, the first curved convex surface 240, the sides 280 and 290, the second curved convex surface 260, the second plane 270, and the light incident surface 230. Moreover, in the embodiment, the inner surface 162 is extended and bended along with shapes of the first plane 250, the first curved convex surface 240, the sides 280 and 290, the second curved convex surface 260, and the second plane 270.

In the backlight module 100 of the embodiment, since the LGP 200 has the first plane 250, the first curved convex surface 240, the second plane 270, and the second curved convex surface 260 at two sides of the light incident surface 230, the light beam 132 from the light incident surface 230 may be evenly transmitted to a portion of the visual area A of the LGP 200 apart form the light incident surface 230, so that the backlight module 100 may provide a surface light source with a better uniformity. In detail, the first plane 250, the first curved convex surface 240, the second plane 270, and the second curved convex surface 260 may reflect a part of the light beam 132 to a portion of the visual area A apart from the light incident surface 230, or the light beam 132 may be reflected to a portion of the visual area A apart from the light incident surface 230 by a portion of the inner surface 160 of the outer frame 160 adjacent to the first plane 250, the first curved convex surface 240, the second plane 270, and the second curved convex surface 260. In this way, the uniformity of the surface light source may be improved. Moreover, the first curved convex surface 240 and the second curved convex surface 260 may increase a propagating distance of the light beam 132 within the LGP 200, so as to increase an area of the visual area A. In addition, design of the first curved convex surface 240 and the second curved convex surface 260 may also effectively improve a brightness uniformity of regions of the visual area A adjacent to the first side N1 and the second side N2.

Moreover, since the backlight module 100 of the embodiment uses a corner light incident method (as the light incident surface 230 is disposed at a corner of the LGP 200), a number of the LEDs or other light emitting devices included in the light emitting unit 130 may be reduced, so as to reduce a cost of the light emitting unit 130. Moreover, since the light emitting unit 130 is disposed at the corner of the LGP 200 rather than being disposed at a side of the LGP as the conventional backlight module does, the backlight module 100 of the embodiment does not have a hot spot phenomenon usually occurred in the conventional backlight module. By suitably adjusting a distribution state of the light-scattering microstructures 205, the surface light source emitted from the visual area A may have a better uniformity.

To increase the uniformity and luminance of the surface light source provided by the backlight module 100, in the embodiment, at least one optical film 170 (in FIG. 1A, four optical films 170a, 170b, 170c and 170d are taken as an example) may be disposed on the first surface 210, wherein the optical film 170a and the optical film 170d are, for example, diffusers, and the optical film 170b and the optical film 170c are, for example, prism sheets, though the invention is not limited thereto.

To avoid excessive brightness at the corner of the visual area A adjacent to the light incident surface 230, a light absorbing unit 140 (shown in FIG. 1A, FIG. 1C and FIG. 4) is disposed between the second surface 220 and the reflection unit 120, and the light absorbing unit 140 is located at a corner of the reflection unit 120 adjacent to the light incident surface 230. In this way, the light absorbing unit 140 may absorb at least a part of the excessively extensive light beam 132 at a place in the LGP 200 adjacent to the light incident surface 230, so as to effectively improve the uniformity of the surface light source.

In the embodiment, the light absorbing unit 140 is a light absorbing material coated on the reflection unit 120, and a light absorbing rate of the light absorbing material is progressively decreased from a place adjacent to the light incident surface 230 towards a place apart from the light incident surface 230. Since a light intensity of the light beam 132 is stronger at the place adjacent to the light incident surface 230, progressive decreasing of the light absorbing rate of the light absorbing material may result in a fact that the light intensity of the surface light source at the place adjacent to the light incident surface 230 may be still maintained uniform. Progressive decreasing of the light absorbing rate of the light absorbing material may be implemented by progressively decreasing a concentration of light absorbing components in the light absorbing material, or by progressively decreasing a thickness of the light absorbing material. In the embodiment, an average light absorbing rate of the light absorbing unit 140 is greater than or equal to 50%, and is smaller than or equal to 80%, wherein the average light absorbing rate is defined as a sum of the light absorbing rates of all positions on the light absorbing unit 140 divided by a total area of the light absorbing unit 140. In this way, a better uniformity of the surface light source is achieved. Moreover, the average light absorbing rate of the light absorbing unit 140 is not limited to be greater than or equal to 50% and smaller than or equal to 80%, and in other embodiments, the average light absorbing rate may fall within different ranges according to an actual utilization requirement.

Figure 5:
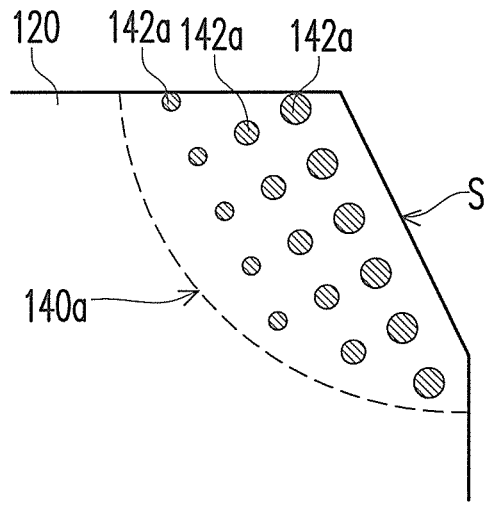
FIG. 5 is a diagram illustrating a corner of a reflection unit of a backlight module and a light absorbing unit thereon according to another embodiment of the invention.

Referring to FIG. 5, the backlight module of the embodiment is similar to the backlight module 100 of FIG. 1B, and a difference therebetween lies in the light absorbing unit. In the embodiment, each of the light absorbing units 140a is a patterned light absorbing unit, and an area ratio that the light absorbing unit 140a occupies the reflection unit 120 in a unit area is progressively decreased from a place (i.e. a place adjacent to a side S of the reflection unit 120) adjacent to the light incident surface 230 (shown in FIGS. 1A-1C) towards a place apart from the light incident surface 230. In this way, the surface light source at the corner of the visual area A (shown in FIG. 1B) adjacent to the light incident surface 230 may be maintained to have a better uniformity. In the embodiment, the light absorbing unit 140a includes a plurality of light absorbing patterns 142a separate from each other, and areas of the light absorbing patterns 142a are progressively decreased from a place adjacent to the light incident surface 230 towards a place apart from the light incident surface 230.

Figure 6:
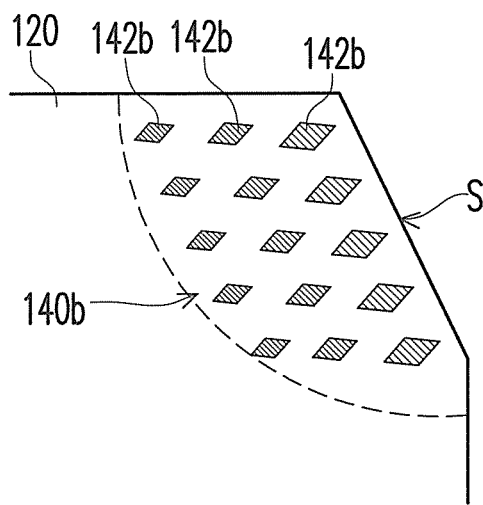
FIG. 6 is a diagram illustrating a corner of a reflection unit of a backlight module and a light absorbing unit thereon according to still another embodiment of the invention.

Referring to FIG. 6, the light absorbing unit 140b of the embodiment is similar to the light absorbing unit 140a of FIG. 5, and a difference therebetween lies in different shapes of the light absorbing patterns. In FIG. 5, the light absorbing patterns 142a are, for example, round-shaped, while in the embodiment, the absorbing patterns 142b are, for example, polygon-shaped, and in FIG. 6, being quadrilateral-shaped are taken as an example.

Referring to FIG. 7, the light absorbing unit 140c of the embodiment is similar to the light absorbing unit 140a of FIG. 5, and a difference therebetween is as follows. In the embodiment, areas of each light absorbing pattern 142c are substantially the same, though a number density of the light absorbing patterns 142c is progressively decreased from a place adjacent to the light incident surface 230 (shown in FIGS. 1A-1C) towards a place apart from the light incident surface 230.

Referring to FIG. 8A, the light absorbing unit 140d of the embodiment is similar to the light absorbing unit 140b of FIG. 6, and a difference therebetween is as follows. In the embodiment, each of the light absorbing patterns 142d has a strip shape, and lengths of the light absorbing patterns 142d in an extending direction are progressively decreased from a place adjacent to the light incident surface 230 (shown in FIGS. 1A-1C) to a place apart from the light incident surface 230.

Referring to FIG. 8B, the light absorbing unit 140e of the embodiment is similar to the light absorbing unit 140d of FIG. 8A, and a difference therebetween lies in extending directions of the light absorbing patterns. In FIG. 8A, the extending direction of the light absorbing patterns 142d is substantially parallel to a side S' of the reflection unit 120. However, in the embodiment, the extending direction of the light absorbing patterns 142e is substantially perpendicular to the side S.

Sizes, directions and shapes of the light absorbing patterns are not limited by the invention, and in other embodiments, sizes, directions and shapes of the light absorbing patterns may have other patterns.

Figure 4:
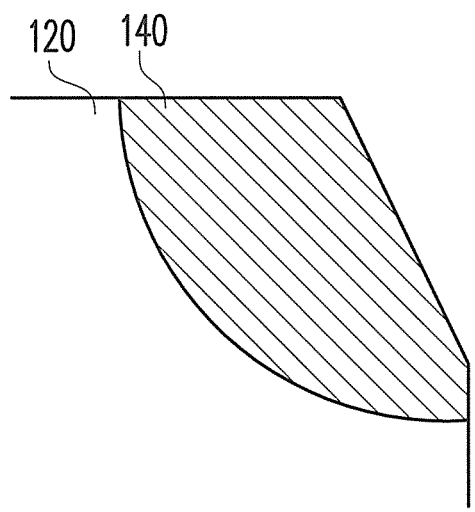
FIG. 4 is a diagram illustrating a corner of a reflection unit of FIG. 1 and a light absorbing unit thereon.
Figure 9:
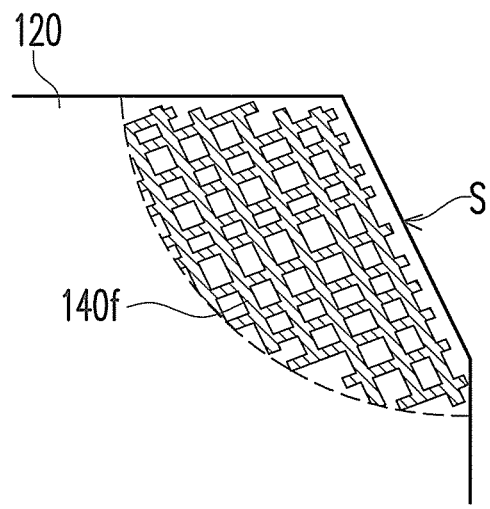
FIG. 9 is a diagram illustrating a corner of a reflection unit of a backlight module and a light absorbing unit thereon according to still another embodiment of the invention.

Referring to FIG. 9, the light absorbing unit 140f of the embodiment is similar to the light absorbing unit 140 of FIG. 4, and a difference therebetween lies in that the light absorbing unit 140f is a patterned light absorbing unit. In the embodiment, the light absorbing unit 140f has a mesh shape, though in other embodiments, the light absorbing units may also have other continuous or discontinuous patterns. Moreover, a similarity of the light absorbing unit 140f and the light absorbing unit 140 of FIG. 4 is that the light absorbing unit 140f is also a light absorbing material coated on the reflection unit, and a light absorbing rate of the light absorbing material is progressively decreased from a place adjacent to the light incident surface 230 (shown in FIGS. 1A-1C) towards a place apart from the light incident surface 230, i.e. the change of the light absorbing rate is also implemented by changing a concentration of the light absorbing components or changing a thickness of the light absorbing material as described in the embodiment of FIGS. 1A-1C and FIG. 4.

Figure 10:
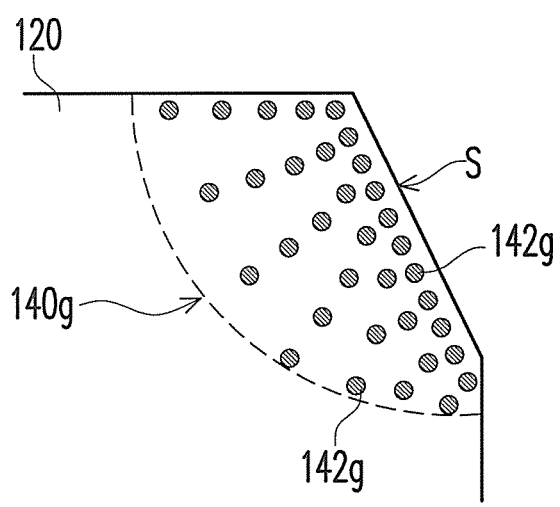
FIG. 10 is a is a diagram illustrating a corner of a reflection unit of a backlight module and a light absorbing unit thereon according to still another embodiment of the invention.

Referring to FIG. 10, the light absorbing unit 140g of the embodiment is similar to the light absorbing unit 140c of FIG. 7. In the embodiment, spaces of the light absorbing patterns 142g are progressively increased from a place adjacent to the light incident surface 230 (shown in FIGS. 1A-1C) towards a place apart from the light incident surface 230.

Figure 11:
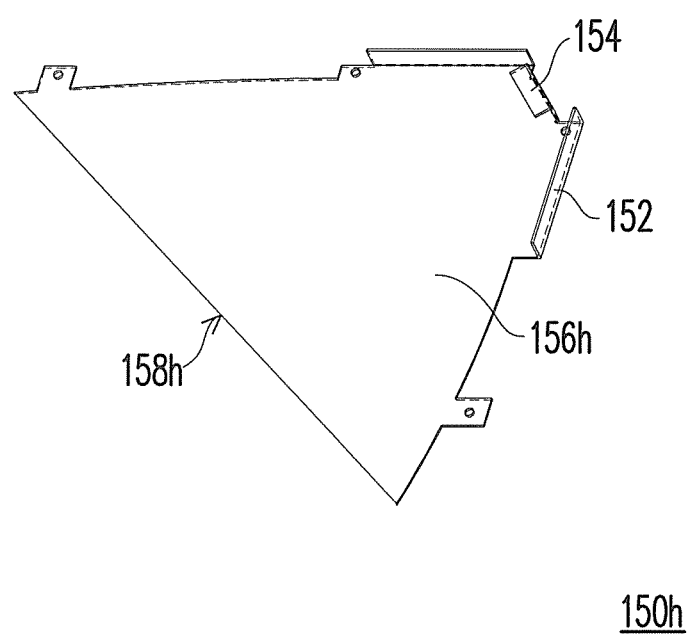
FIG. 11 is a three-dimensional view of a heat sink of a backlight module according to another embodiment of the invention.

Referring to FIG. 11, the heat sink 150h of the embodiment is similar to the heat sink 150 of FIG. 3, and a difference therebetween lies in that a side 158h of the heat sink 150h opposite to the lampshade portion 154 is a straight line. The shape of the heat sink is not limited by the invention, and in other embodiments, the heat sink may also have other suitable shape.

In summary, the backlight module according to the embodiments of the invention may have at least one of the following advantages or effects. In the backlight module according to the embodiments of the invention, since the LGP has the first plane, the first curved convex surface, the second plane and the second curved convex surface at two sides of the light incident surface, the light beam from the light incident surface may be evenly transmitted to a portion of the LGP located apart from the light incident surface, so that the backlight module according to the embodiments of the invention may provide a surface light source with better uniformity.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A backlight module, comprising:
   a light guide plate, having:
      a first surface, having a visual area;
      a second surface, opposite to the first surface;
      a light incident surface, connecting the first surface and the second surface;
      a first curved convex surface, connecting the first surface and the second surface;
      a first plane, connecting the first surface and the second surface, and connecting the first curved convex surface and the light incident surface;
      a second curved convex surface, connecting the first surface and the second surface; and
      a second plane, connecting the first surface and the second surface, and connecting the second curved convex surface and the light incident surface, wherein the light incident surface connects the first plane and the second plane, a distance between the visual area and a first end of the first curved convex surface connected to the first plane is greater than a distance between the visual area and a second end of the first curved convex surface apart from the first plane, and a distance between the visual area and a third end of the second curved convex surface connected to the second plane is greater than a distance between the visual area and a fourth end of the second curved convex surface apart from the second plane; and
   a light emitting unit, disposed beside the light incident surface, and capable of emitting a light beam, wherein the light beam is capable of entering the light guide plate through the light incident surface, and is capable of being transmitted out of the light guide plate through the visual area of the first surface.

2. The backlight module as claimed in claim 1, wherein the light incident surface is located at a corner of the light guide plate.

3. The backlight module as claimed in claim 1, wherein the visual area has a first side and a second side connected to the first side, an angle unequal to 180 degrees is formed between the first side and the second side, the light incident surface is located between the light emitting unit and the angle, the first plane and the first curved convex surface are located at a side of the first side, and the second plane and the second curved convex surface are located at a side of the second side.

4. The backlight module as claimed in claim 3, wherein an absolute value of a slope of the first curved convex surface relative to the first side is progressively decreased from the second end to the first end, and an absolute value of a slope of the second curved convex surface relative to the second side is progressively decreased from the fourth end to the third end.

5. The backlight module as claimed in claim 4, wherein the slope of the first curved convex surface at the first end is closed to or equal to a slope of the first plane relative to the first side, and the slope of the second curved convex surface at the third end is closed to or equal to a slope of the second plane relative to the second side.

6. The backlight module as claimed in claim 3, wherein the angle between the first side and the second side is substantially equal to 90 degrees, and a length of the first side is greater than a length of the second side.

7. The backlight module as claimed in claim 3, wherein the first plane is substantially parallel to the first side, the second plane is substantially parallel to the second side, and the first side is substantially perpendicular to the second side.

8. The backlight module as claimed in claim 7, wherein the visual area is a rectangular region, and the light incident surface and the light emitting unit are located on an extending line of a diagonal of the visual area.

9. The backlight module as claimed in claim 8, wherein the extending line of the diagonal of the visual area is substantially perpendicular to the light incident surface.

10. The backlight module as claimed in claim 1, further comprising a reflection unit disposed at a side of the second surface.

11. The backlight module as claimed in claim 10, further comprising a light absorbing unit disposed between the second surface and the reflection unit, and located at a corner of the reflection unit adjacent to the light incident surface.

12. The backlight module as claimed in claim 11, wherein the light absorbing unit is a light absorbing material coated on the reflection unit.

13. The backlight module as claimed in claim 12, wherein a light absorbing rate of the light absorbing material is progressively decreased from a place adjacent to the light incident surface towards a place apart from the light incident surface.

14. The backlight module as claimed in claim 11, wherein the light absorbing unit is a patterned light absorbing unit, and an occupying area ratio of the patterned light absorbing unit occupying the reflection unit in a unit area is progressively decreased from a place adjacent to the light incident surface towards a place apart from the light incident surface.

15. The backlight module as claimed in claim 14, wherein the patterned light absorbing unit is a light absorbing material coated on the reflection unit.

16. The backlight module as claimed in claim 15, wherein a light absorbing rate of the light absorbing material is progressively decreased from a place adjacent to the light incident surface towards a place apart from the light incident surface.

17. The backlight module as claimed in claim 14, wherein the patterned light absorbing unit comprises a plurality of light absorbing patterns separate from each other, and areas of the light absorbing patterns are progressively decreased from a place adjacent to the light incident surface towards a place apart from the light incident surface.

18. The backlight module as claimed in claim 14, wherein the patterned light absorbing unit comprises a plurality of light absorbing patterns separate from each other, and spaces of the light absorbing patterns are progressively increased from a place adjacent to the light incident surface towards a place apart from the light incident surface.

19. The backlight module as claimed in claim 14, wherein the patterned light absorbing unit comprises a plurality of light absorbing patterns separate from each other, and a number density of the light absorbing patterns is progressively decreased from a place adjacent to the light incident surface towards a place apart from the light incident surface.

20. The backlight module as claimed in claim 1, further comprising an outer frame wrapping an edge of the light guide plate and covering an area of the first surface other than the visual area.

* * * * *